United States Patent
Whitworth et al.

(10) Patent No.: US 9,034,137 B2
(45) Date of Patent: May 19, 2015

(54) IN-SITU, MULTI-STAGE DEBULK, COMPACTION, AND SINGLE STAGE CURING OF THICK COMPOSITE REPAIR LAMINATES

(75) Inventors: Denver R. Whitworth, North Richland Hills, TX (US); Vance N. Cribb, Grapevine, TX (US); Dumitru R. Jitariu, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 157 days.

(21) Appl. No.: 12/742,568

(22) PCT Filed: Nov. 26, 2008

(86) PCT No.: PCT/US2008/084984
§ 371 (c)(1),
(2), (4) Date: May 12, 2010

(87) PCT Pub. No.: WO2009/070737
PCT Pub. Date: Jun. 4, 2009

(65) Prior Publication Data
US 2010/0258235 A1    Oct. 14, 2010

Related U.S. Application Data

(60) Provisional application No. 60/990,028, filed on Nov. 26, 2007.

(51) Int. Cl.
| | | |
|---|---|---|
| *B29C 65/00* | (2006.01) | |
| *B32B 37/00* | (2006.01) | |
| *B28B 1/26* | (2006.01) | |
| *B29C 45/00* | (2006.01) | |
| *B29C 47/00* | (2006.01) | |
| *B29C 43/02* | (2006.01) | |
| *B29C 49/00* | (2006.01) | |
| *B29C 51/00* | (2006.01) | |
| *B32B 15/00* | (2006.01) | |
| *B29C 39/14* | (2006.01) | |
| *B29C 43/10* | (2006.01) | |
| *B28B 21/36* | (2006.01) | |
| *A01J 21/00* | (2006.01) | |
| *A01J 25/12* | (2006.01) | |
| *A21C 3/00* | (2006.01) | |
| *B29B 11/06* | (2006.01) | |
| *A23P 1/00* | (2006.01) | |
| *B29C 73/10* | (2006.01) | |
| *B32B 43/00* | (2006.01) | |
| *B29C 37/00* | (2006.01) | |
| *B32B 38/10* | (2006.01) | |

(52) U.S. Cl.
CPC ............ *B29C 73/10* (2013.01); *B29C 37/0075* (2013.01); *B32B 38/10* (2013.01); *B32B 43/00* (2013.01); *B32B 2605/00* (2013.01); *B32B 2605/18* (2013.01)

(58) Field of Classification Search
CPC  B29C 63/00; B29C 63/0047; B29C 63/0065; B29C 63/0091; B29C 63/02; B29C 63/20; B29C 65/00; B29C 65/02; B29C 65/48; B29C 65/483; B29C 65/4835; B29C 66/00; B29C 66/001; B29C 66/00145; B29C 35/00; B29C 35/02; B29C 73/00; B29C 73/10; B29C 73/24; B29C 73/30; B29C 73/32; B29C 73/34; B32B 1/00; B32B 3/00; B32B 3/30; B32B 2556/00
USPC ............ 156/285, 286, 382; 264/87, 511, 526, 264/553, 566, 568, 571, 101, 102; 425/504, 425/405.1, 405.2, 546, 388
See application file for complete search history.

(56) References Cited

U.S. PATENT DOCUMENTS

| | | | | |
|---|---|---|---|---|
| 5,123,985 A | * | 6/1992 | Evans et al. | 156/213 |
| 5,190,611 A | * | 3/1993 | Cologna et al. | 156/98 |
| 5,213,985 A | | 5/1993 | Sandroff et al. | |
| 5,848,767 A | * | 12/1998 | Cappa et al. | 244/158.1 |
| 5,958,166 A | * | 9/1999 | Walters et al. | 156/94 |
| 6,149,749 A | * | 11/2000 | McBroom | 156/94 |
| 6,270,603 B1 | | 8/2001 | Westerman et al. | |
| 6,391,436 B1 | | 5/2002 | Xu et al. | |
| 2003/0188821 A1 | * | 10/2003 | Keller et al. | 156/94 |
| 2006/0191624 A1 | | 8/2006 | Whitworth et al. | |

FOREIGN PATENT DOCUMENTS

WO    01/00405 A2    1/2001

OTHER PUBLICATIONS

Chinese Office Action dated Aug. 31, 2012 from counterpart CN Application No. 200880117826.9.
Canadian Office Action dated May 22, 2012 from counterpart CA Application No. 2,705,778.
Extended European Search Report issued by the European Patent Office from corresponding Application # 08854165.1, dated Aug. 23, 2012, 8 pages.
Dastin S.: "Repairing Advanced Composite Materials", Machine Design, Penton Media, Cleveland, OH, US, vol. 58, No. 4, Feb. 1, 1986, pp. 86-90.
Chinese Office Action dated Oct. 11, 2013 from counterpart CN Application No. 200880117826.9.
European Office Action dated Apr. 9, 2014 from counterpart EP Application No. 08854165.1-1703.

* cited by examiner

*Primary Examiner* — Richard Crispino
*Assistant Examiner* — Matthew Hoover
(74) *Attorney, Agent, or Firm* — James E. Walton; Richard G. Eldredge

(57) ABSTRACT

A method for fabricating a repair laminate for a composite part having an exposed surface includes applying a bonding material to the exposed surface and forming an uncured ply stack assembly on the bonding material. The uncured ply stack assembly is formed by forming and compacting a series of uncured ply stacks. The ply stack assembly and bonding material are then cured.

10 Claims, 2 Drawing Sheets

IN-SITU, MULTI-STAGE DEBULK, COMPACTION, AND SINGLE STAGE CURING OF THICK COMPOSITE REPAIR LAMINATES

TECHNICAL FIELD

The present invention relates to methods of fabricating laminates made from polymeric-matrix composite materials.

DESCRIPTION OF THE PRIOR ART

Parts made from polymeric-matrix composite materials form many components in modern automotive, aeronautical, and marine vehicles, as well as components in many other types of equipment and structures. Such parts may, from time to time, become damaged, thus requiring repair or replacement. It is often required or at least more cost effective to repair a damaged part than to replace the part. Conventional methods of repairing polymeric-matrix composite parts require the use of specialized tooling and double vacuum tool/processes, which require multiple staging operations and cure cycles, or specialized lay-up tools and autoclave processing, which is expensive and often impractical when used to facilitate a repair.

There are many ways to repair damaged polymeric-matrix composite parts that are well known in the art; however, considerable shortcomings remain.

BRIEF DESCRIPTION OF THE DRAWINGS

The novel features believed characteristic of the invention are set forth in the description. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein.

Figure 1:
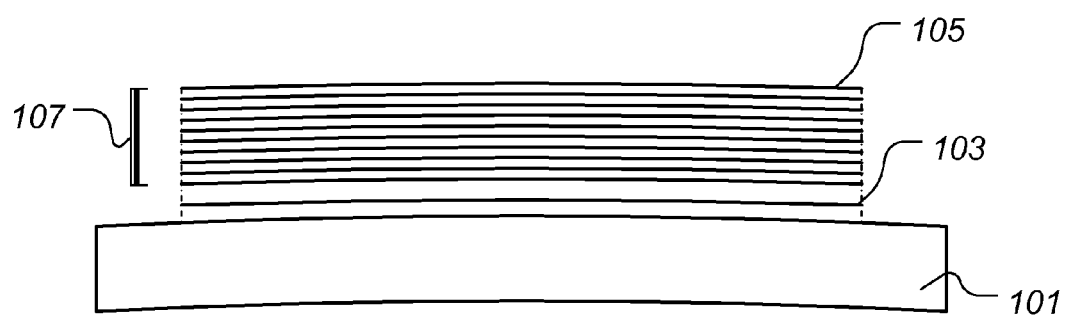
FIG. 1 is an elevated side view of uncured plies applied to an in-situ composite part according to the method of the present application.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as described herein.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents a method for in-situ, multi-stage debulking, compaction, and single stage curing of thick composite repair laminates made from one or more polymeric-matrix composite materials. In one embodiment, the method is applied to the repair of an existing composite part. The method provides a composite part meeting the same laminate quality requirements as a thick laminate made using highly-pressurized autoclave processing. For the purposes of this disclosure, the term "thick laminate" means a laminate made from more than about 10 plies of polymeric-matrix composite material.

Referring to FIG. 1 in the drawings, a pre-existing in-situ composite part 101 is shown. It should be noted that in-situ composite part 101 may be planar or non-planar in form. In a preferred embodiment, uncured plies 105 is no more than about ten plies disposed within a first ply stack 107 (only one uncured ply is labeled for clarity). Uncured Plies 105 may comprise "wet layup" plies or pre-impregnated, i.e., "prepreg" plies. A bonding material 103 is applied to in-situ composite part 101 and ply stack 107. Note that in this one method of bonding ply stack assembly 305 to in-situ composite part 101. Bonding material 103 also includes, and is not limited to: a layer of adhesive paste or a layer of adhesive film disposed between ply assembly 305 (as shown in FIG. 1) and/or adhesive material disposed within ply stack assembly 305.

Figure 2:
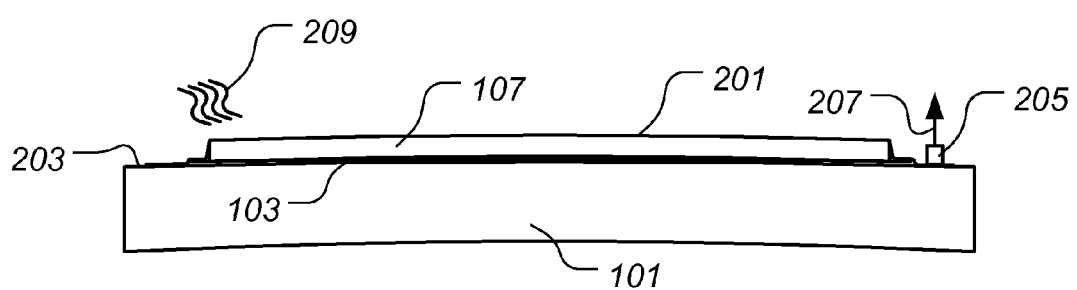
FIG. 2 is an elevated side view of a sealing bag enclosing a ply stack on the in-situ composite part according to the method of the present application.

Referring now to FIG. 2, bleeder material (not shown) and a sealing bag 201 is applied over first ply stack 107 and adhesive layer 103 in a conventional manner. Sealing bag 201 is attached to an exposed surface 203 of in-situ composite part 101 to create a substantially airtight seal between exposed surface 203 and sealing bag 201. A vacuum port 205 extends through sealing bag 201 to allow gases to be withdrawn from sealing bag 201 within the substantially airtight seal between sealing bag 201 and exposed surface 203. A vacuum assembly (not shown) is attached to vacuum port 205, which evacuates gases, as represented by arrow 207, from within the sealed volume of sealing bag 201. In a preferred embodiment, vacuum at a level of two to three inches of mercury is applied to the sealed volume of sealing bag 201. In addition to applying vacuum, a heat source 209 heats at least first ply stack 107 to a desired debulking and compaction temperature. In a preferred embodiment, sufficient heat is applied to first ply stack 107 by heat source 209 to raise the temperature of first ply stack 107 to a temperature of about 125 degrees Fahrenheit. First ply stack 107 is maintained at the desired temperature, e.g., about 125 degrees Fahrenheit, under vacuum, e.g., about one to two inches of mercury, for a time period sufficient to debulk and partially compact first ply stack 107. In a preferred embodiment, first ply stack 107 is maintained at the desired temperature and under vacuum for about one hour. Subsequently, first ply stack 107 is preferably maintained at the desired temperature under full vacuum, e.g., about 28 inches of mercury, for a period of time of about 30 minutes to further compact first ply stack 107. After the desired period of debulking and compaction time, sealing bag 201, the breather material, and any other ancillary processing materials are removed from first ply stack 107 and in-situ composite part 101. First ply stack 107 is now debulked and compacted.

It should be noted that the debulking and compaction temperature is a temperature below a curing temperature of the polymer-matrix composite material and below a curing temperature of adhesive layer 103.

Figure 3:
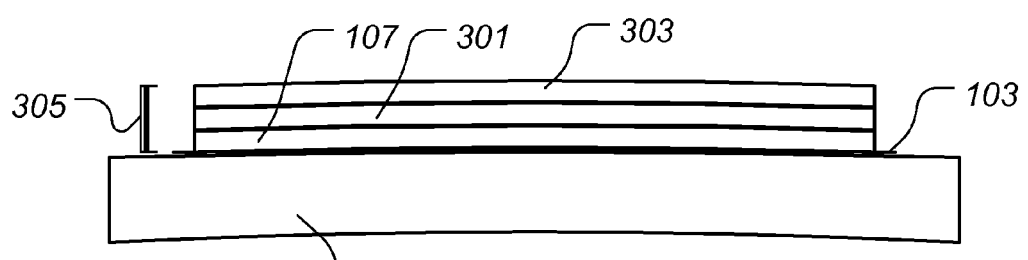
FIG. 3 is an elevated side view of multiple ply stacks on the in-situ composite part according to the method of the present application.

Referring now to FIG. 3, a plurality of ply stacks, such as first ply stack 107, a second ply stack 301, and a third ply stack 303, are combined to form a ply stack assembly 305. Ply stack assembly 305 may comprise any suitable, desired number of ply stacks, such as ply stacks 107, 301, and 303. In the illustrated embodiment, second ply stack 301 is formed by applying a plurality of plies, preferably no more than about ten plies, to first ply stack 107. A bag, such as sealing bag 201, is then applied to first ply stack 107 and second ply stack 301. Vacuum and heat are then applied to bagged first ply stack 107 and second ply stack 301 according to the method described herein concerning FIG. 2. Third ply stack 303, as well as any desired ply stacks in addition to third ply stack 303, are formed by the same method as second ply stack 301.

Figure 4:
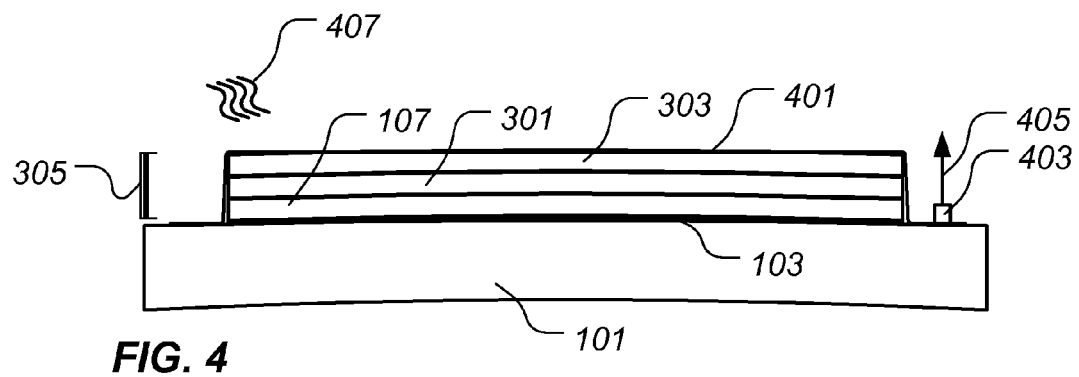
FIG. 4 is an elevated side view of a sealing bag enclosing multiple ply stacks on the in-situ composite part according to the method of the present application.
Figure 5:
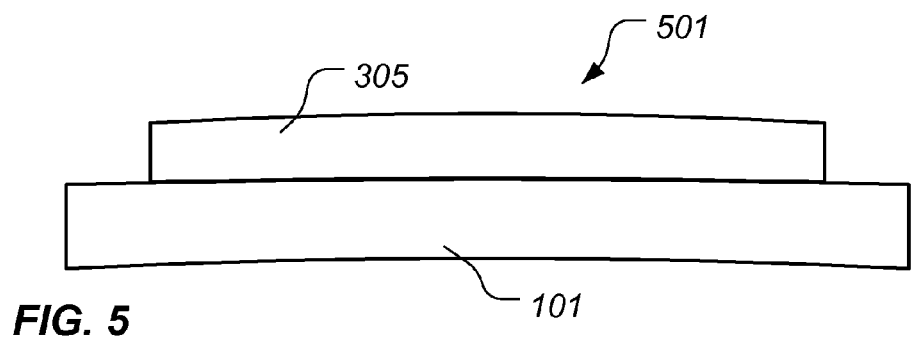
FIG. 5 is an elevated side view of a cured composite layer on the in-situ composite part according to the method of the present application.

Once the total number of desired ply stacks have been debulked and compacted, e.g., third ply stack 301 in the illustrated embodiment, the bleeder material (not shown) and a sealing bag 401 remains covering ply stack assembly 305, as depicted in FIG. 4, for curing of ply stack assembly 305. A vacuum assembly (not shown) is attached to vacuum port 403, which evacuates gases, as represented by arrow 405, from within the sealed volume of sealing bag 401. In a preferred embodiment, full vacuum, e.g., about 28 inches of mercury, is applied to the sealed volume of sealing bag 401. In addition to applying vacuum, a heat source 407 heats at least ply stack assembly 305 to a desired curing temperature, which is dependent upon the particular composite material being used. In one embodiment, sufficient heat is applied to ply stack assembly 305 by heat source 407 to raise the temperature of ply stack assembly 305 to a temperature of about 250 degrees Fahrenheit. Ply stack assembly 305 is maintained at the desired temperature under full vacuum for a time period sufficient to sufficiently cure ply stack assembly 305 and adhesive layer 103 to form composite laminate 501, shown in FIG. 5. In a preferred embodiment, ply stack assembly 305 is maintained at the desired temperature and under vacuum for about two hours. After the desired curing time, sealing bag 401, the breather material, and any other ancillary processing materials are removed from composite laminate 501, as depicted in FIG. 5. The cured ply stack assembly 305 and the previous in-situ composite part 101 now form parts of composite laminate 501, as the cured ply stack assembly 305 is adhesively bonded to the pre-existing form of in-situ composite part 101.

Figure 6:
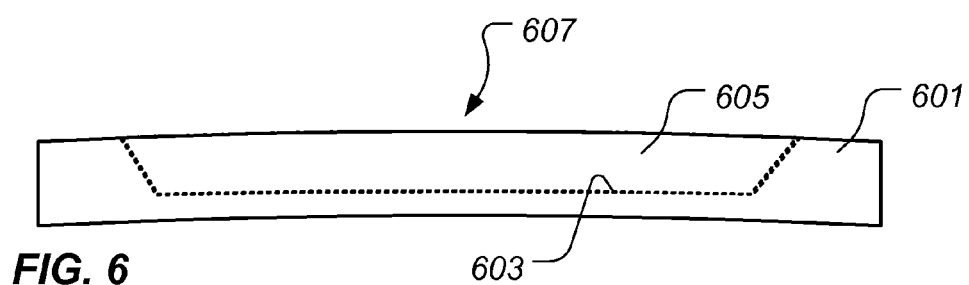
FIG. 6 is an elevated side view of an alternative embodiment of the in-situ composite part according to the method of the present application.

It should also be noted that a damaged composite part 601, shown in FIG. 6, may be machined or scarfed to define a recess 603 into which a ply stack assembly 605 is received, cured, and adhesively bonded to composite part 601 to form composite laminate 607.

The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified and all such variations are considered within the scope and spirit of the invention. Accordingly, the protection sought herein is as set forth in the description. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A method for fabricating a repair laminate for a composite part having a damaged exposed surface, comprising:
   preparing the damaged exposed surface for bonding the repair laminate thereon;
   applying bonding material to the damaged exposed surface;
   forming an uncured ply stack assembly that comprises a first ply stack and a second ply stack, the forming of the uncured ply stack assembly including:
      forming a first uncured ply stack over the damaged exposed surface on the bonding material, the first uncured ply stack including a plurality of uncured plies;
      applying a vacuum and heat to the thus formed first uncured ply stack prior to forming a second uncured ply stack over the damaged exposed surface, wherein the temperature of the heat applied is below a curing temperature, thus the first uncured ply stack remains uncured after heat is applied;
      compacting the first uncured ply stack with the vacuum and heat applied thereto, thereby forming a compacted first uncured ply stack from the first uncured ply stack, the first uncured ply stack remaining uncured but compacted;
      forming the second uncured ply stack over the compacted first uncured ply stack, the second uncured ply stack including a plurality of uncured plies; and
      applying the vacuum and heat to the thus formed second uncured ply stack, wherein the temperature of the heat applied is below the curing temperature, thus the second uncured ply stack remains uncured after heat is applied; and
      compacting the second uncured ply stack with the vacuum and heat applied thereto, the second uncured ply stack remaining uncured but compacted; and
   curing the uncured ply stack assembly and bonding material, thus the first ply stack and the second ply stack being cured.

2. The method according to claim 1, wherein at least one of the first and second uncured ply stacks includes one or more uncured plies comprising polymeric-matrix composite materials.

3. The method according to claim 1, wherein at least one of the uncured ply stacks comprises fewer than ten uncured plies.

4. The method according to claim 1, wherein the forming of the uncured ply stack assembly further includes, for each uncured ply stack, at least partially enclosing the uncured ply stack within a sealing bag and attaching the sealing bag to the damaged exposed surface to create an air tight seal around the uncured ply stack.

5. The method according to claim 4, wherein the applying of the vacuum includes evacuating gases from within the sealing bag.

6. The method according to claim 5, wherein the applying of the vacuum includes increasing vacuum pressure within the sealing bag to a first pressure level for a first predetermined amount of time.

7. The method according to claim 6, wherein the applying of the vacuum includes increasing vacuum pressure within the sealing bag to a second pressure level for a second predetermined amount of time.

8. The method according to claim 4, wherein the applying of the heat includes increasing the temperature within the sealing bag to a first temperature for a first predetermined amount of time.

9. The method according to claim 1, wherein the applying of the heat includes increasing the temperature of the first uncured ply stack to a first temperature for a first predetermined amount of time.

10. The method according to claim 1, wherein the curing of the uncured ply stack assembly includes:
- at least partially enclosing the uncured ply stack assembly within a sealing bag and attaching the sealing bag to the damaged exposed surface to create an air tight seal around the uncured ply stack assembly;
- increasing vacuum pressure within the sealing bag; and
- increasing the temperature within the sealing bag to the curing temperature.

\* \* \* \* \*